United States Patent [19]
Salakari

[11] 3,884,284
[45] May 20, 1975

[54] DEVICE FOR PREVENTING THE SKIDDING OF WHEELS AND SIMILAR OBJECTS

[76] Inventor: Martti Salakari, 21500 Piikkio, Finland

[22] Filed: Mar. 16, 1973

[21] Appl. No.: 342,251

[30] Foreign Application Priority Data
Mar. 22, 1972  Finland .................... 780/72

[52] U.S. Cl. ............................................. 152/210
[51] Int. Cl. ............................................ B60c 11/16
[58] Field of Search ........................... 152/210 V

[56] References Cited
UNITED STATES PATENTS
3,464,476  9/1969  Scheuba et al. ............... 152/210
3,667,528  6/1972  Gottauf........................... 152/210

*Primary Examiner*—James B. Marbert
*Attorney, Agent, or Firm*—Ernest G. Montague; Karl F. Ross; Herbert Dubno

[57] ABSTRACT

A stud, for installation in the wearing surface of a tire, includes a stem or trunk having a central bore. A central shank has a wear resistant headpart inserted into and projecting from the central bore, is adapted to engage the roadway, and is telescopically received by the trunk, at least one substantially straight, concentric sleeve, fitting over the latter. The trunk and central shank are formed with a plurality of holes extending inwardly from their respective outer surface substantially in the direction of the central axis of the trunk.

6 Claims, 5 Drawing Figures

DEVICE FOR PREVENTING THE SKIDDING OF WHEELS AND SIMILAR OBJECTS

FIELD OF THE INVENTION

The present invention relates to antiskidding devices, used on vehicles, to improve their pulling ability and to prevent them from skidding.

BACKGROUND OF THE INVENTION

The most common form of antiskidding devices is a stem, provided with a base and sometimes also with cone-shaped parts embedded in the wearing surface of a tire. It has been found that the sharp edges of the base flange and even worse, the edges of any remaining flanges of the stem cut into the rubber of the tire and cause pieces of it to break away therefrom. Thus the stability of the stud deteriorates, and it may also easily become detached from the tire. As the head of the stud is provided with a relatively large cone-shaped extension compared to the slender stem and the thin base flange or flanges, the stem and the flanges cannot withstand the horizontal forces encountered, so that the stud gets worn down and eats into the tire. Thus a progressive inclination of the stud with respect to radius of the tire, with the stud no longer holding in place, results in rendering the latter ineffective. A severe disadvantage when using studs, particularly in tires of bulldozers, tractors and similar utility vehicles is the fact that such studs under the stress encountered sink deeply into the rubber of the tire and thus cause the latter to break. As studs of tires intended for heavy equipment have furthermore used a stem of steel, the studs themselves have also been heavy. At high speeds the studs have been either forced completely out of the tire, or as a result of the centrifugal developed force have stuck to the road; this in turn has resulted in a heavy wear of the roadway.

OBJECT OF THE INVENTION

It is therefore an object of the present invention to provide an antiskidding device, where the stud does not cut into the resilient material such as rubber, rubber of the tire, and where the tire carrying an embedded stud does not damage the roadway.

SUMMARY OF THE INVENTION

The stud of the antiskidding device described does not sink deeply into, or become detached from the resilient material forming the tire, nor wear the roadway unnecessarily, is light, does not rust, nor become corroded by water or salt. The head of the stud wears in the same proportion as the vertical material of the tire and the stem is effective until worn down at least of its wearing away. The stud remains upright and firmly in position.

BRIEF DESCRIPTION OF THE DRAWING

These and other features of the invention will become apparent and better understood from the following detailed description, accompanying drawings shown by way of example only, in which.

SPECIFIC DESCRIPTION

Figure 1:
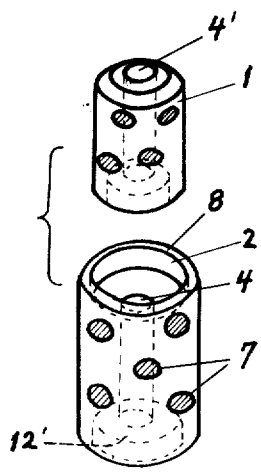
FIG. 1 is an exploded view of the stem of a stud, the stem having its two parts.
Figure 2:
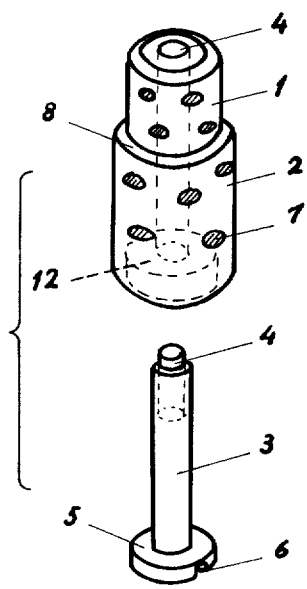
FIG. 2 is a perspective view of the stem in its assembled position, and of a central shank removed therefrom.

FIG. 1 is an exploded view of a stud using a two-part stem made of sleeves 1 and 2 and a core or central-shank 3. The latter has a headpart 4 designed to sear, made for example of hard metal and soldered or welded to shank 3, and a base flange 5 with a groove 6 extending diagonally across the bottom of shank 3, preventing the latter from turning. Shank or stem 3 is preferably made of light material, for example of plastic, or light-metal, or the like; it can be machined or cast. In one version of the invention, stem 3 is made of one part, so that it is a straight cylinder. Another version, shown in FIGS. 1 and 2, uses two concentrically arranged sleeves 1 and 2 made of the same material, the sleeves having different diameters; sleeve 2 is formed with a rim 8, and sleeve 1 is formed with an opening 4' to receive a head 4. Opening 4' extends cylindrically downwards. Sleeve 1 can fit into sleeve 2 with a varying degree of tightness. Sleeves 1 and 2 are formed on their respective outer peripheries with holes extending towards the central axis of the stud into which the rubbery material of the tire eventually expands.

As the stud is therefore pushed into a narrow hole of the tire, the resilient material of the tire such as rubber, expands into the holes of the stud and the latter is anchored in place. The end of stem 3 is formed with a base 5 having a rim 12 in order to stabilize the stud within the tire. The stud is assembled in conventional manner by pushing the central-shank 3 into the sleeves 1 and 2 from the base. Central-shank 3 remains in place, because base flange 5 prevents it from being dislodged. The tight fit of central shank 3 can be reinforced by glueing it to sleeves 1 and 2, or it can alternately be installed as a slide fit.

Figure 5:
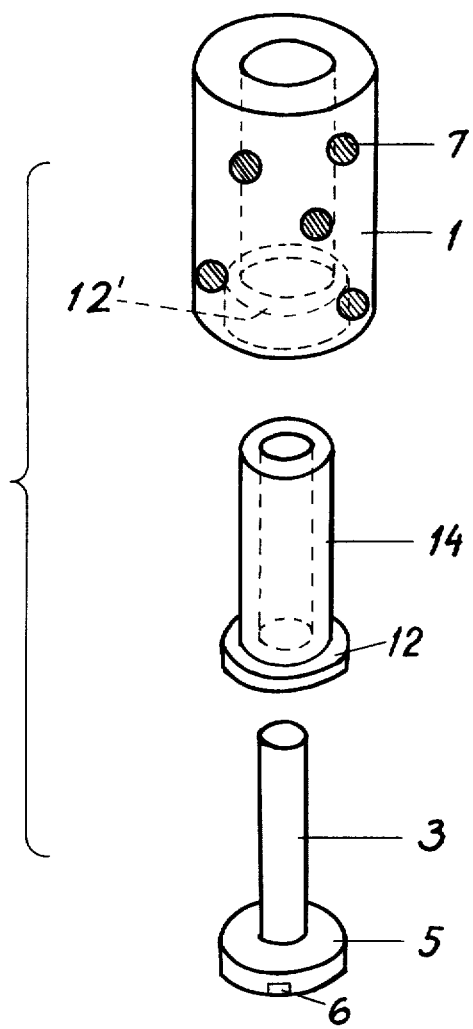
FIG. 5 is an exploded view of a stud including an additional sleeve.

As can be seen from FIG. 5, the stud may also incorporate an additional sleeve 14 having a central bore and disposed between the outer sleeve and the central shank.

Figure 3:
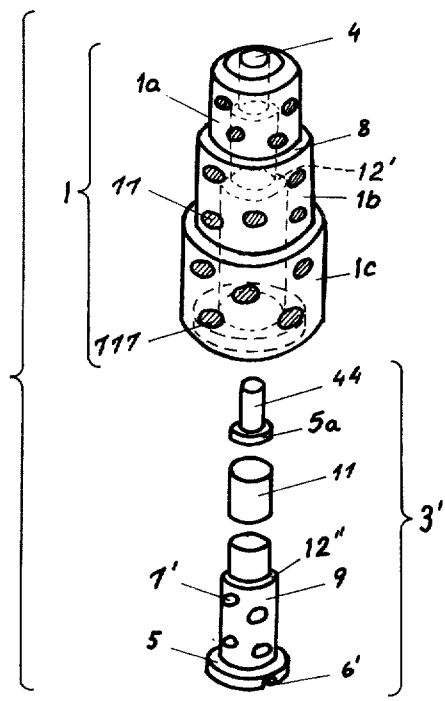
FIG. 3 is a perspective view of a stud in another version of the invention and having a greater number of parts than the version shown in FIGS. 1 and 2.

In the version shown in to FIG. 3, the central shank and the stem are include several parts. An upper sleeve 1a of stem 1 and a cylindrical sleeve 1b below, can consist of the same material, the latter being formed with two concentric bores of differing diameter resulting in the formation of an annular lip 12', sleeve 1b is made to fit into a third sleeve 1c. The central shank has a particularly hard head 44, with an extended flange or base 5a which prevents head 44 from getting detached from the upper part of the stud. Below the head there is an elastic sleeve 11 made, for instance, of rubber, its main purpose being to let head part 44 slide inwards when the latter touches the road surface; damage to the road surface is thus avoided. A sleeve 9 forms the lowest part of central shank 3' and is formed with holes 7' in expansion of the resilient tire material thereinto and a groove 6' running diagonally across. In the familiar way central shank 3' is pressed into the stem 1 from its base, so that holes 7' and 777' are aligned.

Figure 4:
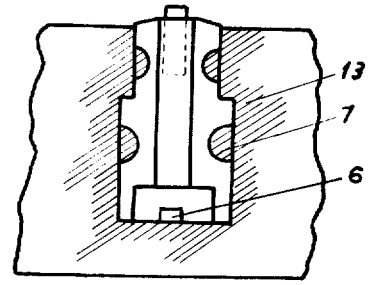
FIG. 4 is a fragmentary cross-section of a stud inserted into a tire.

FIG. 4 shows the effect of expansion of the resilient material of tire 13 into holes 7. When the tight-fitted stud is pressed into the cylinder-shaped opening formed in the resilient material of tire 13, the surrounding material expands into holes 7; when the stud is moving relative to the resilient material of the tire, the surrounding resilient material closest to the stud follows this movement, due to at least some resilient material-portions protruding into holes 7 of the stem, as is shown in FIG. 4. In this way it is possible to a large extent to minimize the disadvantageous wearing-down effect of the stud surface in relation to the resilient material of which the tire is formed. The plate-like base 5 of central shank 3 is supported by the resilient material swelling into groove 6 from below. Furthermore, as the collar-shaped lower rim of base 5 of the stud is first penetrating the resilient material, due to a downward movement of the stud, the resistance of the latter increases as the stud is pressed harder, since additional resilient material is filling in and surrounding any possible voids.

A stud manufactured in this manner is light and of low inertia; even a relatively small force exerted by the road surface can press down the head 4 of the stud to the level of the tire material, without causing any unnecessary wear of the roadway; neither does the stud tend to be dislodged from the surface of the tire to the same degree as, for example, a heavy steel-stud.

This fact has a two-fold advantage: it prevents the stud from assuming an inclined position with respect to the tire and avoids unnecessary damage to the roadway.

The head of the stem is amply dimensioned, is therefore stable and can resist any horizontal forces, which are for example caused by wheel traction, braking or by the vehicle turning a curve. Since the stud is made very strong, it can resist considerable stresses and can be used also for studding of tires to be fitted on wheels of heavy equipment.

While I have disclosed several embodiments of my present invention, it is to be understood, that these embodiments are given by way of example only and not in any limiting sense.

I claim:

1. A stud for installation in the wearing surface of a tire made of resilient material comprising:
   a stem formed with a control bore;
   a concentric sleeve fitting at least partly over said stem; and
   a central shank having a wear-resistant head-part projecting from said central bore, and adapted to engage a roadway, said stem and said shank being formed with a plurality of holes extending from respective outer surfaces thereof substantially in a direction towards the central axis of said stem for receiving at least portions of said resilient material.

2. A stud, as set forth in claim 1, wherein said central shank has a base flange, adapted for being supported by said resilient material of said tire.

3. A stud, as set forth in claim 1, further including a plurality of sleeves of different diameters disposed at least partly within each other.

4. A stud, as set forth in claim 3, wherein said holes formed in one of said sleeves are aligned with holes formed in the receiving sleeves, and adapted to receive portions of said resilient material of a surrounding tire.

5. A stud, as set forth in claim 2, wherein said base has a flange formed with a bottom surface and a diagonally running groove adapted to receive said resilient material of said tire, for preventing rotation of said central shank.

6. A stud, as set forth in claim 1, wherein said central shank is at leastly partly made of elastic material, extends through said central bore of said stem and is supported by at least some position of said resilient material of said tire.

* * * * *